T. H. D. MAY.
APPARATUS FOR MEASURING OR APPORTIONING MATERIALS OF A GRANULAR OR OTHER SUITABLE FORM.
APPLICATION FILED NOV. 18, 1907.

958,965.  Patented May 24, 1910.

Witnesses.  Inventor:

UNITED STATES PATENT OFFICE.

THOMAS HUGHES DELABÈRE MAY, OF BATH, ENGLAND.

APPARATUS FOR MEASURING OR APPORTIONING MATERIALS OF A GRANULAR OR OTHER SUITABLE FORM.

958,965.  Specification of Letters Patent.  Patented May 24, 1910.

Application filed November 18, 1907. Serial No. 402,724.

*To all whom it may concern:*

Be it known that I, THOMAS HUGHES DELABÈRE MAY, of Bath, in the United Kingdom of Great Britain, have invented certain new and useful Improvements in Apparatus for Measuring and Apportioning Materials of a Granular or other Suitable Form.

This invention has reference to improvements in or relating to apparatus for measuring or apportioning materials, the latter being such for example as one of the granular or powder nature and adapted to be fed from a hopper for example.

According to the said invention the feed hopper is movable and is combined with a tubular addition barrel or casing arranged at the mouth thereof and movable therewith, the said barrel surrounding a delivery or conveyer screw which latter effects the delivery of the material in the desired quantity or proportion.

In order that the device may be clearly understood and readily carried into effect, reference will now be had to the annexed drawing in which—

Figure 1:
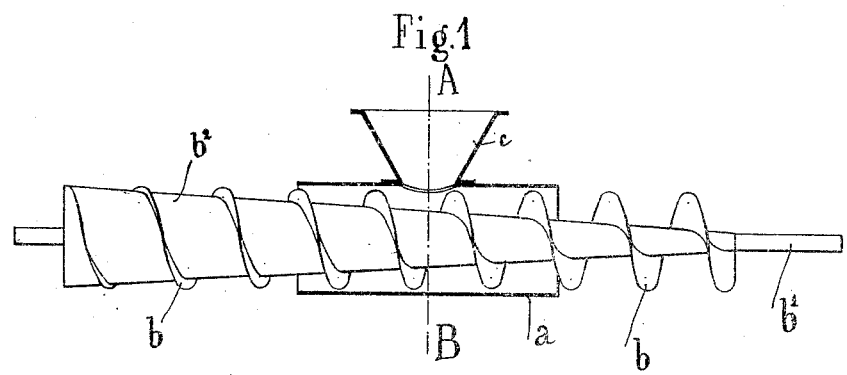
Figure 2:
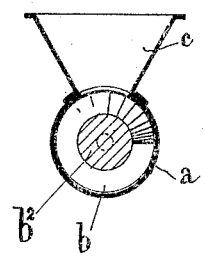

Figure 1 illustrates diagrammatically the arrangement, while Fig. 2 is a section on line A—B of Fig. 1.

$a$ is the sheath or barrel or casing which may be made of thin metal. It acts the part of a casing or trough and in it works the screw $b$ mounted on the shaft $b'$. The barrel serves to carry the hopper $c$ and may, as shown, inclose and be supported by the open screw. This arrangement permits the motion of the screw to set up a jarring or vibration in the hopper which will have the effect of assisting the descent of the materials into the sheath or barrel while the shaking or jarring of the latter will also assist the action of the screw and help to guard against the sticking of the materials. The screw is such that the amount of space or holding capacity between the threads gradually increases and thus the rate of working or the output of the material may be varied by shifting (by any suitable means) the sheath or barrel along into different positions. In the example the threads are parallel as regards their outer edges but gradually increase in depth, this being brought about by making the solid part or core $b^2$ of the screw of conical shape as shown.

In the example shown the rate of delivery would be slowest with the left hand part of the screw under the hopper as there the threads are shallow and have the smallest capacity while at the right hand side the opposite is the case. Two or more screws may be arranged on a common axis, each having its own adjustable barrel or hopper. In this way different materials may be simultaneously delivered in any desired proportion so that when collected and mixed may be of any definite composition depending on the adjustment of the several hoppers. Two or more hoppers may be provided with one or more inclined plates or baffles to moderate the descent of the materials.

I claim:

1. An apparatus for measuring or apportioning materials of granular or other suitable form comprising in combination a screw having a conical core and uniform pitch, a cylindrical barrel, bearing a feed hopper, movable on the screw to regulate the quantity of discharge by the depth alone of the space between the coils of the thread.

2. An apparatus for measuring or apportioning materials of granular or other suitable form comprising in combination a screw having a conical core and uniform pitch, a cylindrical barrel bearing a feed hopper having a discharge opening of constant size and movable and supported on said screw, substantially as set forth.

In witness whereof I have hereunto set my hand in presence of two witnesses.

THOMAS HUGHES DELABÈRE MAY.

Witnesses:
LORIN A. LATHROP,
E. M. TOLERTON.